(No Model.)
J. W. BERRY.
NUT LOCK.
No. 496,847. Patented May 9, 1893.
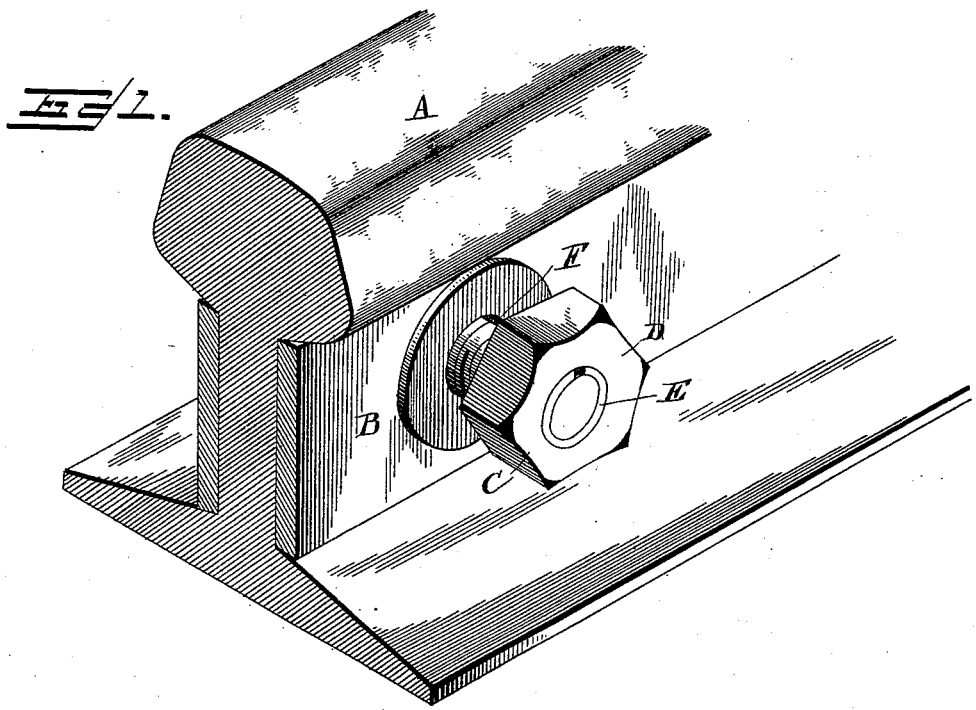
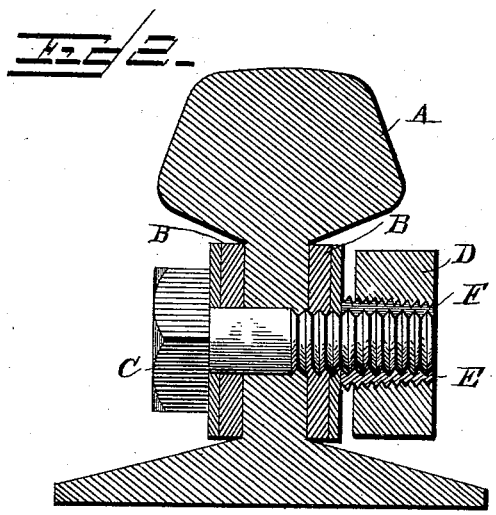
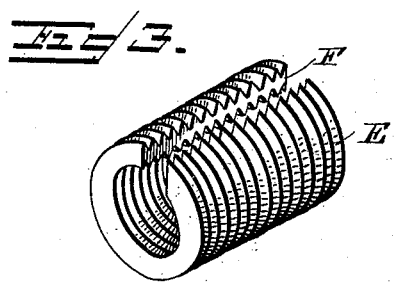
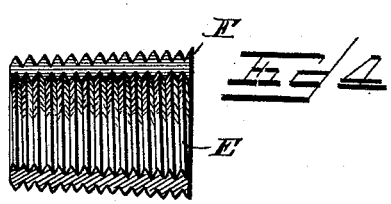
Witnesses
W. E. Schneider.
Inventor
J. W. Berry.
By his Attorneys,
C. A. Snow & Co.

UNITED STATES PATENT OFFICE.

JOHN WESLEY BERRY, OF HATTIESBURG, MISSISSIPPI, ASSIGNOR OF ONE-HALF TO C. C. WARREN, OF SAME PLACE.

NUT-LOCK.

SPECIFICATION forming part of Letters Patent No. 496,847, dated May 9, 1893.

Application filed September 24, 1892. Serial No. 446,785. (No model.)

*To all whom it may concern:*

Be it known that I, JOHN WESLEY BERRY, a citizen of the United States, residing at Hattiesburg, in the county of Perry and State of Mississippi, have invented a new and useful Nut-Lock, of which the following is a specification.

My invention relates to improvements in nut locks, the objects in view being to provide a simple, cheap, easily operated and effective nut lock, especially adapted for use in connection with the joints between railroad rails.

The invention consists, essentially, in providing an open or split sleeve, to fit upon the bolt within the nut, said sleeve being slightly tapered so that as the nut is tightened it compresses the sleeve upon the bolt.

My invention consists, furthermore, in certain details of construction and arrangement which will appear in the following description and which will be particularly pointed out in the appended claims.

In the drawings, Figure 1 is a perspective view of a bolt and nut provided with my improved locking device, the same being shown in connection with a rail joint. Fig. 2 is a sectional view taken parallel with the axis of the bolt. Fig. 3 is a detail view, in perspective, of the locking sleeve. Fig. 4 is a detail section of the same.

A represents the rail, B the fish-plate, C the bolt by which the rail and fish-plate are secured together, and D the nut which is threaded upon the bolt.

E represents an independent locking sleeve, which is interiorly threaded to fit the bolt and is exteriorly threaded to engage the tap in the nut. This sleeve is open or split, as shown, having a longitudinal slot, F, extending its entire length, and furthermore, is slightly tapered, as will be seen by reference to the drawings, especially Fig. 2, the smaller or reduced end being of a size to fit easily into the bore of the nut.

In operation the smaller end of the locking sleeve is screwed into the rear or inner side of the nut, whereby the larger end of said sleeve projects slightly beyond the rear or inner side of the nut. The nut is then applied to the bolt, upon which the interior threaded surface of the sleeve fits snugly, and is screwed to place. As the rear or inner side of the nut approaches the surface of the fish-plate, washer, or other device, the projecting, thickened end of the sleeve engages or strikes said surface, and if the turning of the nut is continued it is caused to turn upon the sleeve, which is held stationary by its contact with said fish-plate or washer, and the sleeve is compressed upon the bolt and forms a friction lock capable of resisting any amount of jar to which it is liable to be subjected.

It will be seen that the bolt and nut are each of the ordinary formation, the only departure from the common practice being that the bore of the nut is slightly larger than the bolt. The threaded and split sleeve may be applied to any bolt which will pass thereinto, and the bore of the nut must be of sufficient size to engage the smaller end of the sleeve.

Having thus described my invention, what I claim, and desire to secure by Letters Patent, is—

1. The combination with a bolt and nut of the ordinary construction, of a locking device consisting of an exteriorly tapered sleeve split longitudinally upon one side from end to end and threaded interiorly to engage the bolt and exteriorly to engage the nut, the exterior diameter of the smaller end of said sleeve being equal to the diameter of the bore of the nut, substantially as specified.

2. As a new article of manufacture, a nut locking device consisting of a sleeve split longitudinally from end to end upon one side and provided with interior and exterior threads, the bore of the sleeve being parallel sided and the exterior thereof being tapered regularly from one end to the other, substantially as specified.

In testimony that I claim the foregoing as my own I have hereto affixed my signature in the presence of two witnesses.

JOHN WESLEY BERRY.

Witnesses:
J. B. GRAHAM,
THOMAS J. MCGEE.